United States Patent
Krut et al.

(10) Patent No.: US 10,826,895 B1
(45) Date of Patent: Nov. 3, 2020

(54) SYSTEM AND METHOD FOR SECURE AUTHENTICATED USER SESSION HANDOFF

(71) Applicant: State Farm Mutual Automobile Insurance Company, Bloomington, IL (US)

(72) Inventors: Derek Krut, Bloomington, IL (US); Neill Broadstone, Bloomington, IL (US); Sekhar Muppalla, McKinney, TX (US); Gary L. Littell, Goodfield, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 286 days.

(21) Appl. No.: 16/151,833

(22) Filed: Oct. 4, 2018

(51) Int. Cl.
*H04L 29/06* (2006.01)
*H04L 9/32* (2006.01)
(Continued)

(52) U.S. Cl.
CPC ........ *H04L 63/0853* (2013.01); *H04L 9/0861* (2013.01); *H04L 9/3228* (2013.01);
(Continued)

(58) Field of Classification Search
CPC ... H04L 63/0853; H04L 63/06; H04L 63/083; H04L 63/0861; H04L 63/105;
(Continued)

(56) References Cited

U.S. PATENT DOCUMENTS 7,890,761 B1  2/2011 Morris
8,156,338 B1  4/2012 Morris
(Continued)

OTHER PUBLICATIONS

Pracucci, Marco; Auto-Login From Native apps to Web; https://github.com/pracucci; Accessed: Sep. 1, 2017.
(Continued)

*Primary Examiner* — Michael S McNally
(74) *Attorney, Agent, or Firm* — Faegre Drinker Biddle & Reath

(57) ABSTRACT

A system and method for enabling user session persistence between a native application and a mobile internet browser on a mobile device. The method includes authenticating a use of the native application and issuing an authentication token to the native application. The method also includes receiving from the native application the authentication token in connection with a destination address and obtaining first identifying data regarding the mobile device. The method further includes generating a key; associating the key, the authentication token, the destination address, and the first identifying data regarding the mobile device together in a database; encrypting the key to generate an encrypted key; and transmitting the encrypted key to the native application. The native application passes the encrypted key and the client key to the internet browser. The method includes receiving from the mobile internet browser the encrypted key; obtaining second identifying data in connection with the encrypted key received; decrypting the encrypted key to generate a decrypted key; locating the authentication token, the destination address, and the first identifying data within the database using the decrypted key; and confirming that the mobile internet browser is executing on the mobile device based at least in part on a comparison of the first identifying data and the second identifying data. If the mobile internet browser is confirmed, it is granted (Continued)

access to the destination address, which may include a feature implemented on a web application.

20 Claims, 6 Drawing Sheets

(51) Int. Cl.
*H04L 9/08* (2006.01)
*H04W 12/06* (2009.01)
*H04W 12/08* (2009.01)
*H04W 12/12* (2009.01)

(52) U.S. Cl.
CPC ............ *H04L 9/3234* (2013.01); *H04L 63/06* (2013.01); *H04L 63/083* (2013.01); *H04L 63/0861* (2013.01); *H04L 63/105* (2013.01); *H04L 63/108* (2013.01); *H04W 12/06* (2013.01); *H04W 12/08* (2013.01); *H04W 12/12* (2013.01); *H04L 2209/80* (2013.01); *H04L 2463/062* (2013.01)

(58) Field of Classification Search
CPC ... H04L 63/108; H04L 9/0861; H04L 9/3228; H04L 9/3234; H04L 2209/80; H04L 2463/062; H04W 12/06; H04W 12/08; H04W 12/12
USPC ......................................................... 713/168
See application file for complete search history.

(56) References Cited

U.S. PATENT DOCUMENTS

| | | | | |
|---|---|---|---|---|
| 9,088,564 | B1 * | 7/2015 | Hobson | H04L 63/083 |
| 9,225,711 | B1 * | 12/2015 | Sorensen | H04L 63/0815 |
| 2012/0227076 | A1 * | 9/2012 | McCoy | H04N 21/8586 |
| | | | | 725/110 |
| 2013/0086669 | A1 * | 4/2013 | Sondhi | H04W 12/0608 |
| | | | | 726/8 |
| 2014/0181944 | A1 * | 6/2014 | Ahmed | H04W 12/0608 |
| | | | | 726/8 |
| 2014/0207566 | A1 | 7/2014 | Kamran et al. | |
| 2014/0223527 | A1 * | 8/2014 | Bortz | H04L 63/08 |
| | | | | 726/6 |
| 2014/0280694 | A1 * | 9/2014 | Bilange | G06F 9/4451 |
| | | | | 709/217 |
| 2015/0046848 | A1 * | 2/2015 | Vohra | H04M 1/72522 |
| | | | | 715/760 |
| 2016/0048861 | A1 * | 2/2016 | Morgaine | G06Q 30/0214 |
| | | | | 705/14.16 |

OTHER PUBLICATIONS

How does the Slack mobile sign-in link work?; http://littlebigdetails.com/post/101760303076/; Accessed: Sep. 1, 2017.
Owasp; Session Management Cheat Sheet; https://www.owasp.org/index.php?title=Session_Management_Cheat_Sheet&oldid=231870; Accessed: Sep. 5, 2017.

* cited by examiner

SYSTEM AND METHOD FOR SECURE AUTHENTICATED USER SESSION HANDOFF

FIELD OF THE INVENTION

The present invention generally relates to a computer-implemented method and system for enabling user session persistence between a native application and a mobile internet browser.

BACKGROUND

A native application provides a better user experience on a mobile device than a web application. However, a native application will typically have a smaller user base than a web application, so a new digital feature is usually implemented on the web application first. Until the digital feature is implemented on the native application, one temporary solution that extends the feature to the native application is to configure the native application to direct a mobile device's internet browser to call the web application, thereby providing access to the digital feature on the mobile device.

When sensitive information is to be exchanged between the native application and the web application, maintaining information security throughout the navigation from the native application to the web application is paramount. However, the connection between the native application and the internet browser is rarely secure. Thus, when the native application directs the internet browser to call the web application, the use of the internet browser must be authenticated. This requires interrupting the user session with a request and manual reentry and/or confirmation of login credentials via the internet browser. This interruption is highly inconvenient and degrades the user experience.

The background discussion is intended to provide information related to the present invention which is not necessarily prior art.

BRIEF SUMMARY

Embodiments of the present technology relate to systems, computer-implemented methods, and systems comprising computer-readable media for enabling user session persistence between a native application and a mobile internet browser.

In one aspect, a computer-implemented method for enabling user session persistence between a native application and a mobile internet browser may be provided. The method may include: (1) authenticating a use of the native application; (2) issuing an authentication token to the native application; (3) receiving from the native application the authentication token in connection with a destination address; (4) obtaining first identifying data regarding a mobile device; (5) generating a key; (6) associating the key, the authentication token, the destination address, and the first identifying data regarding the mobile device together in a database; (7) encrypting the key to generate an encrypted key; (8) transmitting the encrypted key to the native application; (9) receiving from a mobile internet browser the encrypted key; (10) obtaining second identifying data in connection with the encrypted key; (11) decrypting the encrypted key to generate a decrypted key; (12) locating the authentication token, the destination address, and the first identifying data within the database using the decrypted key; and (13) confirming that the mobile internet browser is executing on the mobile device based at least in part on a comparison of the first identifying data and the second identifying data.

In another aspect, a system for enabling user session persistence between a native application and an internet browser may be provided. The system may include a mobile device having the native application and the internet browser executing thereon and a server in communication with the mobile device. The server may include a token management database, an authentication service, an authenticated redirect cache service, and a web application pre-launcher. The authentication service may be configured to: (1) receive login credentials from the native application; (2) verify the login credentials; (3) generate a session token; and (4) transmit the session token to the native application. The authenticated redirect cache service may be configured to: (1) receive from the native application the session token, a first client token, and a desired universal resource identifier (URI); (2) obtain first identifying data from the native application regarding the mobile device; (3) generate a server token; (4) encrypt the server token to generate an encrypted server token; (5) store the server token, the first client token, the desired URI, and the first identifying data in association in the token management database; and (6) transmit the encrypted server token to the native application. The web application pre-launcher may be configured to: (1) receive from the internet browser a second client token and the encrypted server token; (2) obtain second identifying data from the internet browser regarding the mobile device and in connection with the encrypted server token; and (3) provide the second client token, the encrypted server token, and the second identifying data to the authenticated redirect cache service as a redirect request. The authenticated redirect cache service may be further configured to: (1) decrypt the encrypted server token to determine a pointer to a location in the token management database; (2) retrieve the first client token and the first identifying data from the location in the token management database; (3) confirm that the redirect request originated with the mobile device at least in part by verifying respectively that the first client token matches the second client token, and that the first identifying data is consistent with the second identifying data; and (4) transmit the session token and the desired URI to the internet browser via the web application pre-launcher.

In another aspect, a system comprising computer-readable media for enabling user session persistence between a native application and a mobile internet browser on a mobile device may be provided. The system may include a first non-transitory computer-readable medium with a program stored thereon, wherein the program instructs one or more processing element of a server to perform the following: (1) authenticate a use of the native application; (2) issue an authentication token to the native application; (3) receive from the native application the authentication token in connection with a destination address; (4) obtain first identifying data regarding the mobile device; (5) generate a key; (6) associate the key, the authentication token, the destination address, and the first identifying data regarding the mobile device together in a database; (7) encrypt the key to generate an encrypted key; (8) transmit the encrypted key to the native application; (9) receive the encrypted key from the mobile internet browser; (10) obtain second identifying data in connection with the received encrypted key; (11) decrypt the encrypted key to generate a decrypted key; (12) locate the authentication token, the destination address, and the first identifying data within the database using the decrypted key; and (13) confirm that the mobile internet browser is executing on the mobile device based at least in part on a comparison of the first identifying data and the second identifying data.

In another aspect, a system comprising computer-readable media for enabling user session persistence between a native application and a mobile internet browser on a mobile device may be provided. The system may include a first non-transitory computer-readable medium with a program stored thereon, wherein the program instructs one or more processing elements of a server to perform the following: (1) receive login credentials from the native application; (2) verify the login credentials; (3) generate a session token; (4) transmit the session token to the native application; (5) receive from the native application the session token, a first client token, and a desired URI; (6) obtain first identifying data from the native application regarding the mobile device; (7) generate a server token; (8) encrypt the server token to generate an encrypted server token; (9) store the server token, the first client token, the desired URI, and the first identifying data in association in a token management database; (10) transmit the encrypted server token to the native application; (11) receive from the internet browser a second client token and the encrypted server token; (12) obtain second identifying data from the internet browser regarding the mobile device and in connection with the encrypted server token; (13) decrypt the encrypted server token to determine a pointer to a location in the token management database; (14) retrieve the first client token and the first identifying data from the location in the token management database; (15) confirm that the internet browser is executing on the mobile device at least in part by verifying respectively that the first client token matches the second client token, and that the first identifying data is consistent with the second identifying data; and (16) transmit the session token and the desired URI to the internet browser via the web application.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
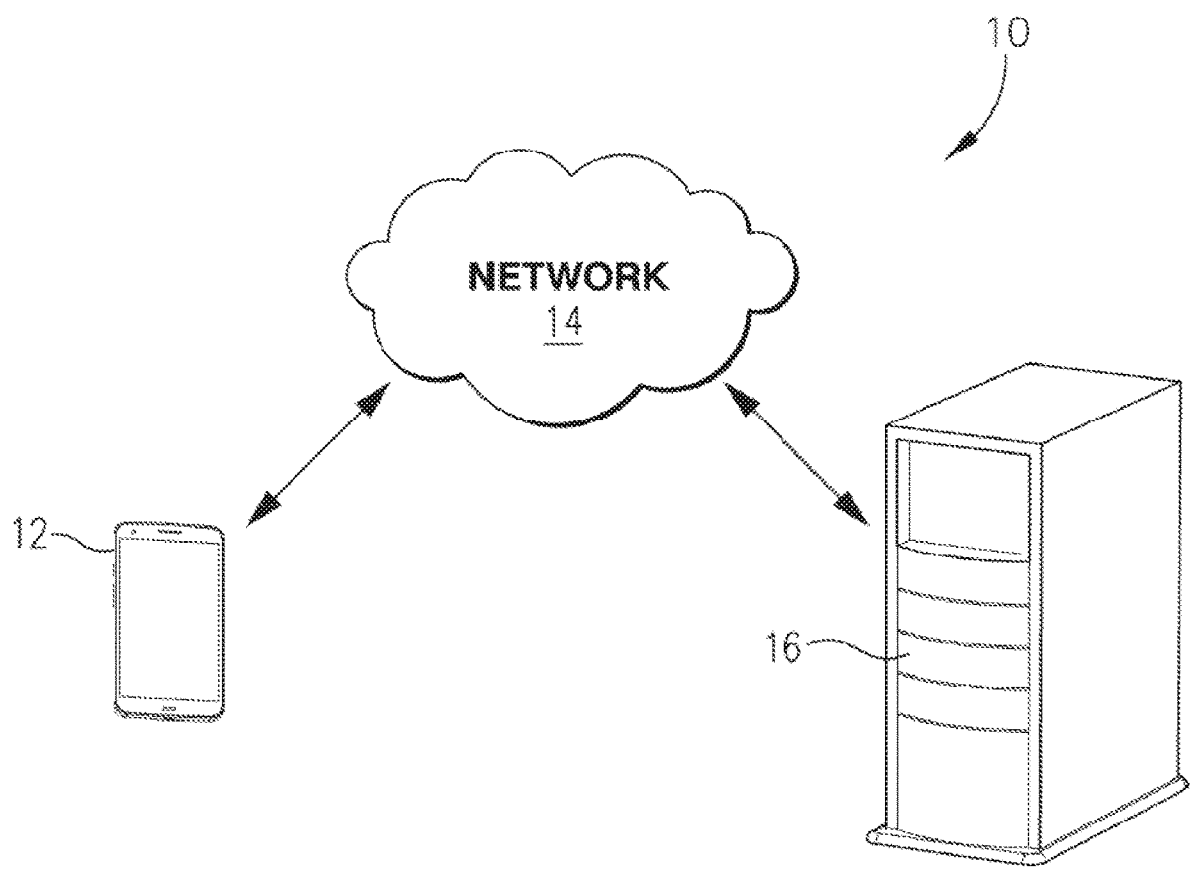
FIG. 1 illustrates an exemplary environment in which embodiments of a system may be utilized for enabling user session persistence when navigating between a native application and a mobile internet browser.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, enabling user session persistence between a native application and a mobile internet browser on a mobile device. Embodiments of the present invention enable requesting and receiving login credentials a single time for two authentications, thereby improving the user experience. Further, embodiments of the present invention may enable automatic navigation from the native application to the mobile internet browser without requiring re-entry of user credentials, while also maintaining information security for information exchanged during the user session.

Present methods of navigation between a native application and an internet browser on a mobile device are inconvenient. Present methods include passing user information across an insecure connection between the native application and the internet browser. When sensitive information is involved, the navigation will require a manual reauthentication security measure before accessing the web application. Manual reauthentication is cumbersome and inconvenient, at least because the user must enter login credentials via the internet browser. The burden may be aggravated where the credentials for authentication of the internet browser are not the same as those used with the native application. For example, the native application may have enabled logins using biometric sensors, whereas the internet browser may not have this capability and may require manual typing of a password or the like into the internet browser.

Embodiments of the present invention provide improved, automated technologies for authenticating a user device that enables secure user session persistence. More particularly, such automated technologies may include a mobile device of the user that executes a native application and a server having a server application configured to interface with the native application and/or the mobile device. When the native application of embodiments of the present invention receives a web application request for a feature implemented as a web application from the user, the native application is configured to transmit the request to the server in exchange for a key that it may pass to the internet browser of the mobile device. The server application may be configured to receive the request and automatically obtain first identifying data regarding the mobile device. The server application may be configured to generate the key at least partly in response to the request, and to transmit the key to the native application. The native application may be configured to automatically pass the key to the internet browser, which may request access to the web application, including by passing the key to the server. The server application is configured to receive from the internet browser the key and to automatically obtain second identifying data regarding the internet browser. The server application may be configured to analyze the first and second identifying data on the one hand, and/or the server-generated key and the key received from the internet browser on the other hand, to verify that native application and the internet browser are executing on the same mobile device. If the identity of the mobile device is confirmed, the server application may automatically grant the internet browser access to the web application, without requiring any manual reauthentication.

Utilizing automated reauthentication techniques of embodiments of the present invention, a user with a mobile device may avoid the pitfalls presented by existing technology, may enjoy enhanced efficiencies, and feature access, development, and/or expansion. For example, through embodiments of the present automated reauthentication process, a native application may incorporate a feature of a web application in a relatively seamless, yet secure, manner. Moreover, embodiments of the present invention may permit convenient and efficient interactions between native applications, mobile internet browsers, web applications, mobile devices, and servers. In addition, processes and techniques of the present invention may be applied across multiple platforms, web applications, application programming interfaces (APIs), different devices, and the like.

Specific embodiments of the technology will now be described in connection with the attached drawing figures. The embodiments are intended to describe aspects of the invention in sufficient detail to enable those skilled in the art to practice the invention. Other embodiments may be utilized and changes may be made without departing from the scope of the present invention. The following detail description is, therefore, not to be taken in a limiting sense. The scope of the present invention is defined only by the appended claims, along with the full scope of equivalents to which such claims are entitled.

Exemplary System

FIG. 1 depicts an exemplary environment in which embodiments of a system 10 may be utilized for enabling user session persistence between a native application and a mobile internet browser on a mobile device. The environment may include a mobile device 12, a network 14 accessible by the mobile device 12, and one or more computer servers 16 communicatively coupled to the network 14.

Figure 2:
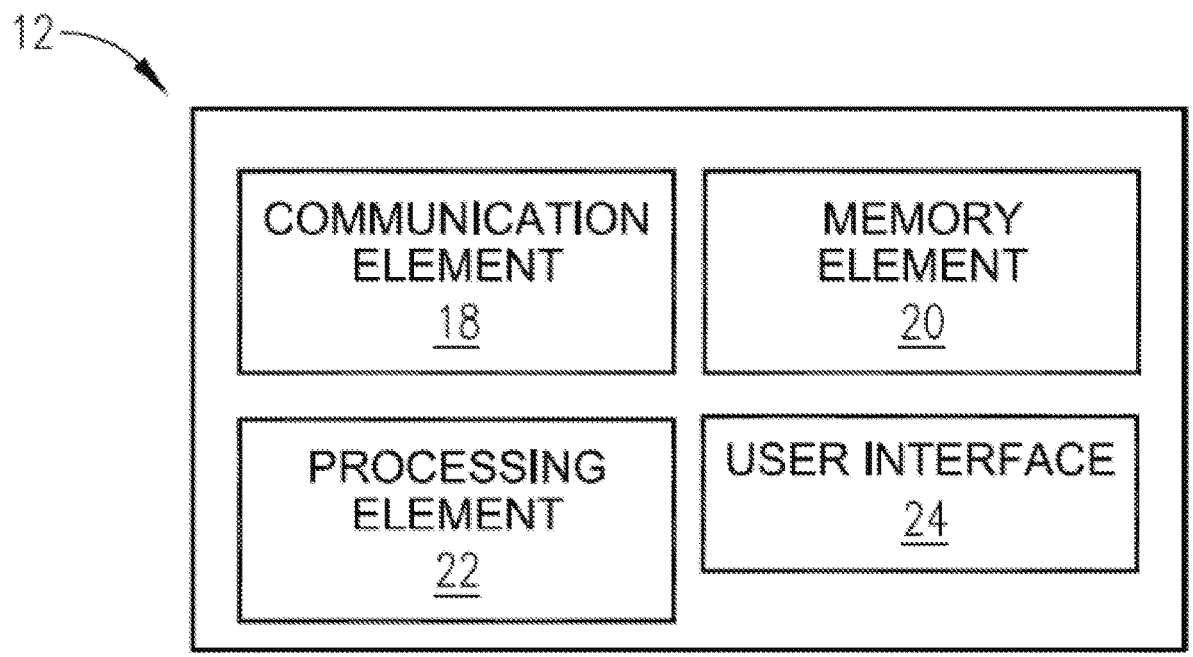
FIG. 2 illustrates a schematic diagram of a mobile device of the exemplary system shown in block schematic form.

FIG. 2 depicts an exemplary mobile device 12 for use in enabling user session persistence. The mobile device 12 may be embodied by a smartphone, a tablet computer, a laptop computer, a phablet, smart glasses, a smart watch, wearable electronics, or the like, and may broadly comprise a communication element 18, a memory element 20, a processing element 22, and a user interface 24. The user interface 24 may have a display comprised of a video device of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The user interface 24 may include a screen on which the information is presented, with the screen possessing a square or a rectangular aspect ratio that may be viewed in either a landscape or a portrait mode. In various embodiments, the user interface 24 may also include a touch screen occupying the entire screen or a portion thereof so that the screen functions as part of the user interface 24. The touch screen may allow the user to interact with the mobile device 12 by physically touching, swiping, or gesturing on areas of the screen.

The user interface 24 generally allows the user to utilize inputs and outputs to interact with the mobile device 12. Inputs may include buttons, pushbuttons, knobs, jog dials, shuttle dials, directional pads, multidirectional buttons, switches, keypads, keyboards, mice, joysticks, microphones, or the like, or combinations thereof. Outputs may include audio speakers, lights, dials, meters, printers, or the like, or combinations thereof. With the user interface 24, the user may be able to control the features and operation of the display. For example, the user may be able to zoom in and out on the display using either virtual onscreen buttons or actual pushbuttons. In addition, the user may be able to pan the image on the display either by touching and swiping the screen of the user interface 24 or by using multidirectional buttons or dials.

Figure 3:
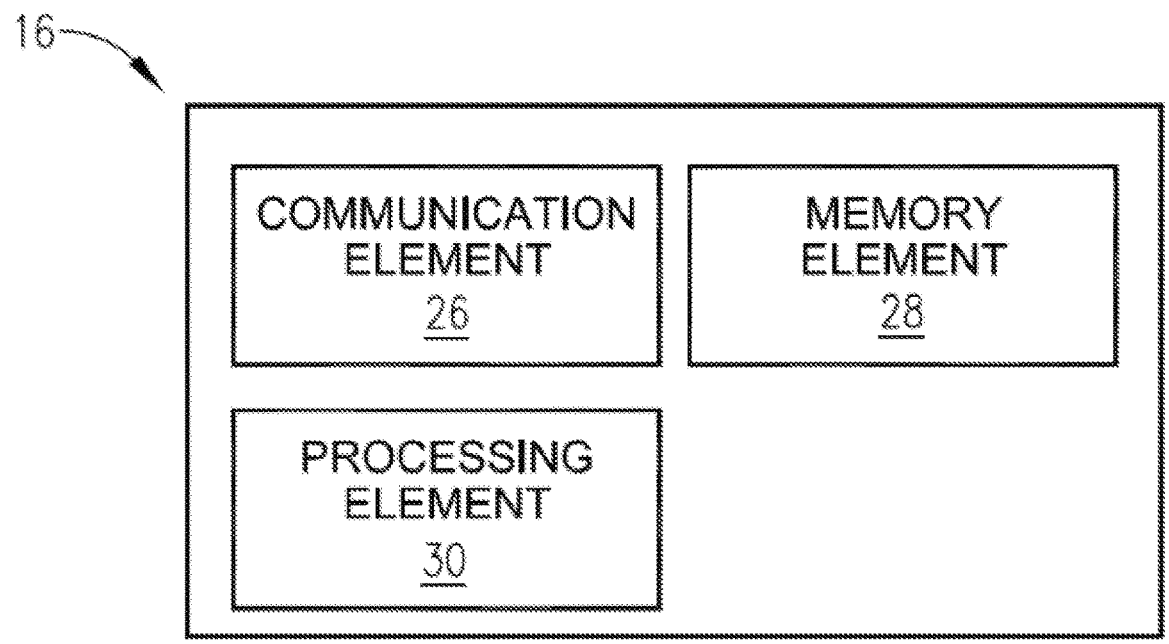
FIG. 3 illustrates a schematic diagram of a server of the exemplary system shown in block schematic form.

FIG. 3 depicts an exemplary server 16 for use in enabling user session persistence. The server 16 may be embodied by one or more application servers, database servers, file servers, gaming servers, mail servers, print servers, web servers, or the like, or combinations thereof. Furthermore, the server 16 may include a plurality of servers, virtual servers, or combinations thereof. The server 16 may be configured to include or execute computer programs and software such as file storage applications, database applications, email or messaging applications, web server applications, or the like, in addition to and/or in conjunction with the computer program and/or software described elsewhere herein (e.g., the source application, the integration application, and/or the inflation application).

The server 16 may include a communication element 26, a memory element 28, and a processing element 30. The communication element 26 generally allows communication with external systems or devices (such as the mobile device 12) and/or between one or more individual servers comprising the server 16.

The communication elements 18, 26 of the mobile device 12 and the server 16 may include signal or data transmitting and receiving circuits, such as antennas, transceivers, amplifiers, filters, mixers, oscillators, digital signal processors (DSPs), and the like. The communication elements 18, 26 may establish communication wirelessly by utilizing RF signals and/or data that comply with communication standards such as cellular 2G, 3G, 4G, 5G, or LTE, IEEE 802.11 standard such as WiFi, IEEE 802.16 standard such as WiMAX, Bluetooth®, or combinations thereof. Alternatively, or in addition, the communication elements 18, 26 may establish communication through connectors or couplers that receive metal conductor wires or cables which are compatible with networking technologies such as ethernet. In certain embodiments, the communication elements 18, 26 may also couple with optical fiber cables. The communication elements 18, 26 may be in communication with or electronically coupled to their respective memory elements 20, 28 and/or processing elements 22, 30.

The memory elements 20, 28 may of the mobile device 12 and the server 16 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof.

In some embodiments, the memory elements 20, 28 may be embedded in, or packaged in the same package as, their respective the processing elements 22, 30. The memory elements 20, 28 may include, or may constitute, a "computer-readable medium." The memory elements 20, 28 may store the instructions, code, code segments, software, firmware, programs, applications, apps, services, daemons, or the like that are executed by their respective processing elements 22, 30. The memory elements 20, 28 may also be in electronic communication with a camera and may store settings, data, metadata, documents, sound files, photographs, movies, images, databases, and the like.

The processing elements 22, 30 of the mobile device 12 and the server 16 may include electronic hardware components such as processors. The processing elements 22, 30 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing elements 22, 30 may generally execute, process, or run instructions, code, code segments, software, firmware, programs, applications, apps, processes, services, daemons, or the like. The processing elements 22, 30 may also include hardware components such as finite-state machines, sequential and combinational logic, and other electronic circuits that may perform the functions necessary for the operation of the current invention. The processing elements 22, 30 may be in communication with the other electronic components through serial or parallel links that include address busses, data busses, control lines, and the like. The processing elements 22, 30 may be in electronic communication with their respective communication elements 18, 26 and memory elements 20, 28.

The network 14 may generally allow communication between the mobile device 12 and the server 16. The network 14 may include local area networks, metro area networks, wide area networks, cloud networks, the Internet, cellular networks, plain old telephone service (POTS) networks, and the like, or combinations thereof. The network 14 may be wired, wireless, or combinations thereof and may include components such as modems, gateways, switches, routers, hubs, access points, repeaters, towers, and the like. The mobile device 12 generally connects to the network 14 wirelessly, such as radio frequency (RF) communication using wireless standards such as cellular 2G, 3G, or 4G, Institute of Electrical and Electronics Engineers (IEEE) 802.11 standards such as WiFi, IEEE 802.16 standards such as WiMAX, Bluetooth®, or combinations thereof.

Figure 4:
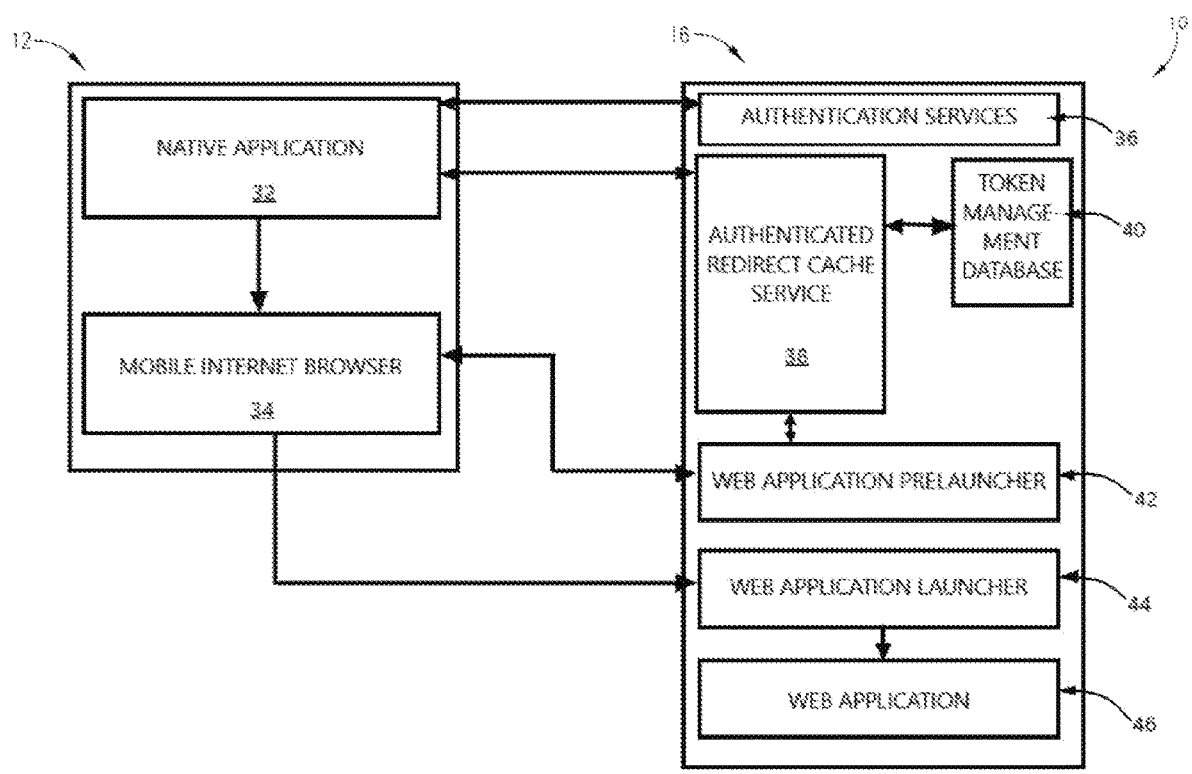
FIG. 4 illustrates a flowchart of various components of the exemplary system of FIG. 1 according to embodiments of the present invention.

Turning to FIG. 4, the mobile device 12 may include a native application 32 and an internet browser 34 executing thereon. The native application 32 and the internet browser 34 may be stored on the memory element 20 and/or externally. In an embodiment, the internet browser 34 may be executed within the native application 32 so that it is an in-app browser of the native application 32. The server 16 may be in communication with the native application 32 and the internet browser 34 of the mobile device 12. The server 16 may include software applications stored on the memory element 28 and/or externally. The software applications may execute program functions, including an authentication service 36, an authenticated redirect cache service 38, a token management database 40, a web application pre-launcher 42, a web application launcher 44, and a web application 46. In some embodiments, the web application pre-launcher 42 and the web application launcher 44 are integral parts of the web application 46. It is foreseen that any number of program functions may be executed by the server to achieve the invention.

The processing element 22 of the mobile device 12 may be programmed or configured, via hardware, software, firmware, or combinations thereof, to perform the following functions of the native application 32 installed on the mobile device 12. The native application 32 may instruct the processing element 22 to receive login credentials from a user interface 24 of the mobile device 12 and transmit the login credentials to the server 16. The login credentials may include a username/password, multi-factor authentication (such as two-factor authentication, two-step verification, or any other multi-factor authentication technique, or combinations thereof), biometric information (such as a fingerprint on a smart phone, facial recognition software, voice recognition software, or the like), or the like.

The processing element 30 of the server 16 may be programmed or configured, via hardware, software, firmware, or combinations thereof, to perform the following functions. The server 16 may receive the login credentials from the native application 32 and verify the login credentials to authenticate the use of the native application 32. Following verification, the server 16 may be configured to generate an authentication token and transmit the authentication token to the native application 32. The authentication token may be a session token, shared secret software token type, or a public-key cryptography software token type. The authentication token may also be a static password token, a synchronous dynamic password token, an asynchronous password token, a challenge response token, or any other security token known in the art. The authentication token may be generated using information regarding the user, the native application 32, the mobile device 12, etc. In an embodiment, the authentication service 36 on the server 16 may be configured to perform the verification of the login credentials and the generation of the authentication token.

The native application 32 may instruct the communication element 18 and/or the processing element 22 to receive the authentication token from the server 16. The native application 32 may instruct the processing element 22 to generate a request for access to a destination address based at least in part on user input received via the user interface 24. The user input may, for example, comprise selection of a feature of the native application 32 that requires access to the web application of the server 16. Also or alternatively, the destination address may be in the form of an input via the user interface 24 that represents a call to a uniform resource identifier (URI), a uniform resource name (URN), or a uniform resource locator (URL). It is foreseen that a wide variety of user input and/or autonomous operation(s) of the native application 32 may trigger generation of the request for access to the destination address without departing from the spirit of the present invention.

The destination address may designate or otherwise be associated with the web application 46 of the server 16. In some embodiments, the destination address may be the URL of a specific server or plurality of servers 16 devoted to execution of the web application 46.

The native application 32 may instruct the processing element 22 to generate a client token, which may be any type of security token known in the art, as outlined above. The client token may be generated based at least in part on user information relevant to persisting the user session. The information may include the user's internet protocol (IP) address, media access control (MAC) address, email address, username, password, or the like. The client token may be generated at least in part through encryption and/or hashing of the information, or other means for securing the information. The native application 32 may instruct the processing element 22 to transmit the destination address, the authentication token, and the client token to the server 16.

In an embodiment, the native application 32 may also instruct the processing element 22 to transmit first identifying data. The first identifying data may be any data related to the identity of the mobile device 12, the user, etc. It may include an IP address of the mobile device 12, a MAC address of the mobile device, a burned-in address, an extended unique identifier, or the like. The first identifying data may also be biometric data, voice recognition, face recognition, GPS coordinates, router information, etc. The first identifying data may be a type of data calculated to ensure the same device and/or user is/are in the session to a degree of certainty commensurate with the requisite security standards or security needs.

The server 16 may be configured to receive from the native application 32 the authentication token, the client token, and the destination address. The server 16 may also obtain the first identifying data regarding the user. Alternatively and/or additionally, the server 16 may obtain the first identifying data by retrieving various types of data about the native application 32 and/or the mobile device 12, such as by accessing information from a server log that tracks requests from the native application 32 and/or the mobile device 12. In an embodiment, the authenticated redirect cache service 38 may receive from the native application 32 the authentication token, the client token, and the destination address.

The server 16 may be configured to generate a key. For example, the server 16 may store the destination address, the authentication token, the first identifying data, and/or the client token in a location in a database on the server 16, such as in the token management database 40. The token management database 40 may be a secure database devoted to storing tokens of user sessions. The key may be generated based on the location in the token management database 40, for instance where the key comprises a primary key and/or pointer to the location in the token management database 40 where the destination address, the authentication token, the first identifying data and/or the client token are stored.

The key may also include and/or be associated with an expiration event. The server 16 may be configured to invalidate the key upon the occurrence of the expiration event, which may be evaluated at any time and/or in connection with or based on any other event outlined herein. The expiration event may correspond to a lapse of a time period following transmission to the native application 32 (or another event described herein), a connection failure, a cancellation of the request, or the like. The server 16 may encrypt the key and transmit the encrypted key to the native application 32. In an embodiment, the authenticated redirect cache service 38 may generate the key.

Data—e.g., the destination address, the authentication token, the first identifying data, and/or the client token—may be associated with one another in the token management database through known database relationships. For instance, relational databases may associate or link the data in one or more tables, each table containing fields organized into records. In such embodiments, each key may correspond to a single record, with the destination address, the authentication token, the first identifying data, and/or the client token being stored in additional fields of the record. One of ordinary skill will appreciate that other means for associating data in a database are within the scope of the present invention.

One or more data elements may also be exchanged between devices in connection with other data elements according to embodiments of the present invention. For example, the authentication token may be received in connection with the destination address. For another example, second identifying data may be obtained in connection with the encrypted key. It is foreseen that a variety of methods for signaling such relationship(s) between data elements may be employed without departing from the spirit of the present invention. One of ordinary skill will appreciate that the degree and type of relation between data elements that is required for receipt of those data elements to be considered "in connection" with one another may vary depending on the preferences of administrator(s). For example, for added certainty that an encrypted key and second identifying data were obtained from a common origin device, an administrator may require that they be received together in the same data packet. Additional certainty may be provided by consulting a checksum value to guard against tampered data packets. In an embodiment, sequence numbers in data packet headers may also or alternatively be utilized to confirm the relationship. However, other mechanisms of secure transmission protocols may also or alternatively ensure a common origin and/or grouping of messages within the scope of the present invention.

The native application 32 may instruct the processing element 22 of the mobile device 12 to receive the encrypted key, and to transmit or otherwise pass the client token and the encrypted key to the internet browser 34 of the mobile device 12. The native application 32 may also instruct the processing element 22 to pass directions to request access to the server 16 with the encrypted key and the client token. For example, the directions may comprise instructions for requesting access to a URL of the web application pre-launcher 42 of the server 16 and/or to the web application 46. The internet browser 34 of the mobile device 12 may instruct the processing element 22 to call the web application pre-launcher 42, via the communication element 18, and to transmit the client token and the encrypted key to the web application pre-launcher 42.

In an embodiment, the internet browser 34 may also instruct the processing element 22 to also send second identifying data. The second identifying data may be the same or a different data type as the first identifying data, so long as there is a consistency between the two that meets the security standards/needs in order to grant access. More particularly, the first identifying data and the second identifying data need not be the same, and need not be the same data type, but should be sufficiently related so that comparison of the first and the second identifying data yields a reasonably certain determination that the native application 32 and the mobile internet browser 34 are executing on the same mobile device 12 and/or are being used by the same (authenticated) user. In an embodiment, the second identifying data may be the same or similar type information as the information used to encrypt the authentication token and/or the client token.

The server 16 may be configured to receive from the internet browser 34 the client token and the encrypted key. The server 16 may also obtain, or receive, second identifying data from the internet browser 34. The second identifying data may be obtained in a similar or different manner than how the first identifying data was obtained. For example, the first identifying data may be transmitted by the native application 32 and include an IP address, and the second identifying data may be obtained by the server 16 by reviewing server logs associated with the internet browser 34. In an embodiment, the web application pre-launcher 42 receives the encrypted key, client token, and second identifying data from the internet browser 34.

The server 16 may verify: that the encrypted key from the internet browser 34 is consistent with the encrypted key passed to the native application 32; that the client token from the internet browser 34 is consistent with the client token received from the native application 32; and/or that the second identifying data is consistent with the first identifying data. In an embodiment, the server 16 may verify that the second identifying data is consistent with the information used to encrypt the authentication token and/or the client token. For example, the web application pre-launcher 42 of the server 16 may pass the encrypted key, the client token (from the internet browser 34), and the second identifying data to the authenticated redirect cache service 38. The authenticated redirect cache service 38 may decrypt the encrypted key to find the location in the token management database 40 storing the client token (from the native application 32), the authentication token, and the first identifying data. The authenticated redirect cache service 38 may verify that the client token retrieved from the token management database 40 is consistent with the client token received from the internet browser 34. Further, the authenticated redirect cache service 38 may verify that the first identifying data retrieved from the token management database 40 is consistent with the second identifying data.

If the server 16 determines that the internet browser 34 is verified, it may grant the internet browser 34 permission to access the destination address, including by transmitting the authentication token to the internet browser 34. For another example, the authenticated redirect cache service 38 may pass the authentication token to the web application pre-launcher 42, which grants the internet browser 34 access to the destination address. The access grant may be in the form of passing a URL of the web application launcher 44—which provides access to the web application 46—to the internet browser 34. The passing of the authentication token, which may include session information, may automatically persist the session.

In an embodiment, the server 16, such as the web application pre-launcher 42 and/or the authenticated redirect cache service 38, may modify the authentication token, depending on the feature being requested. For example, some sensitive information stored in the authentication token may be omitted for additional security purposes and because it is not needed by the feature to perform its function. Also, information relevant to the feature may be appended to the authentication token. As a further example, the authentication may be injected into a session cookie of the internet browser. In some embodiments, the server 16 and/or web application pre-launcher 42 may enable the internet browser 34 to access the feature by sending a hypertext transfer protocol (HTTP) 302 redirect to the internet browser 34, which may redirect the internet browser 34 to the web application launcher 44.

The mobile device 12 may receive the authentication token from the server via the communication element 18 and/or the processing element 22. The internet browser 34 of the mobile device 12 may access a portion of the server 16, such as the web application launcher 44, and transmit the authentication token in order to continue the session and thereby access the web application 46.

If the server 16 determines that the internet browser 34 is not verified, the server 16 may end and/or suspend the session. The server 16 may be configured to notify the user via the native application 32 of the failure to verify and may provide an opportunity for re-verification. The notification may also or alternatively be in the form of a fraud alert, wherein the native application 32 notifies the user that an attempt has been made to impersonate the user. The notification may also be merely a failure notice noting that navigation between the native application 32 and the internet browser 34 failed. The server 16 may be configured to delete any sensitive data involved in an attempted or completed user session persistence operation (e.g., from the token management database 40), such as the key, the authentication token, the destination address, the identifying data, etc.

Figure 5:
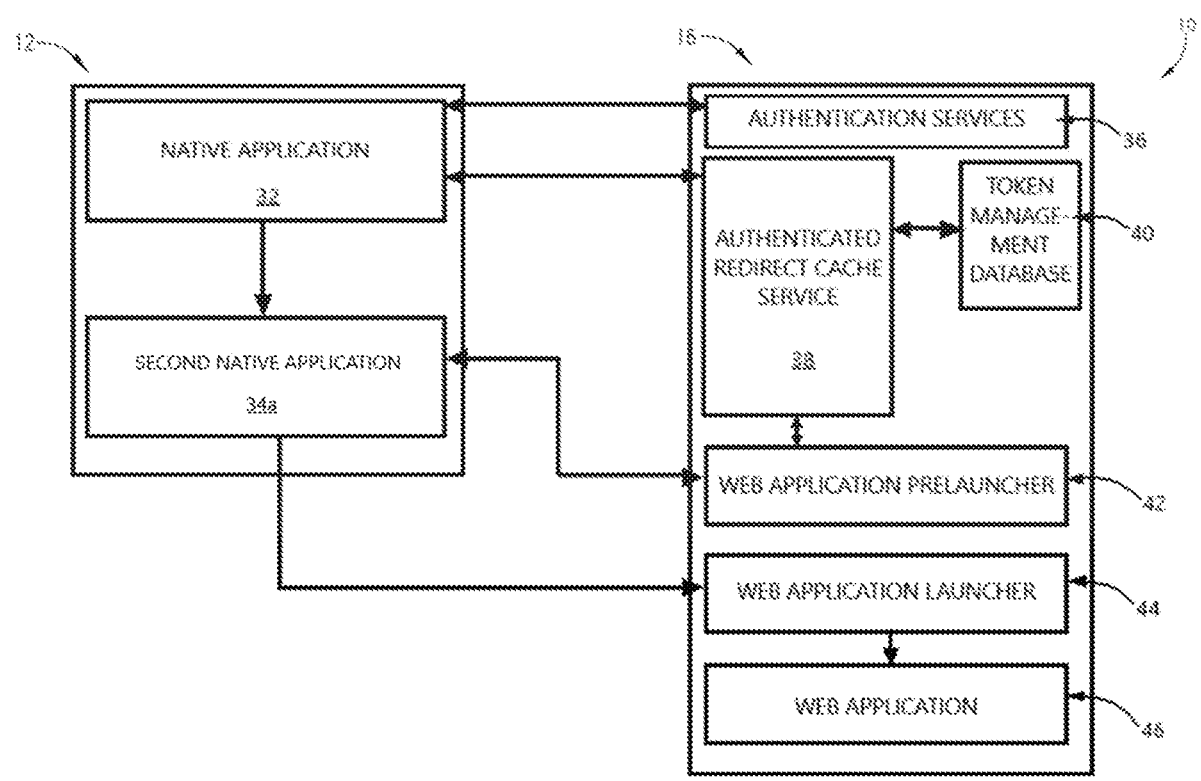
FIG. 5 illustrates a flowchart of various components of the exemplary system of FIG. 1 according to another embodiment of the present invention.

The operations outlined herein may also be implemented between any number of applications to provide user session persistence from one application to another. In other words, the client token may be passed among different applications on the same mobile device 12. For example, as shown in FIG. 5, the native application 32 may pass the encrypted key and client token to a second native application 34a, which is verified by, and communicates with, the server 16. This enables secure extension of features from different native applications to persist a user session. It should be noted that embodiments providing user session persistence from one application to another are similar in some respects to the other embodiments described herein, and may be employed in much the same way. Therefore, for the sake of brevity, only certain unique aspects of such additional embodiment(s) of the user session persistence systems and methods are described in this paragraph, with a complete disclosure of the remaining aspects being readily understood by one of ordinary skill in the art upon a review of the disclosure elsewhere herein.

Figure 6:
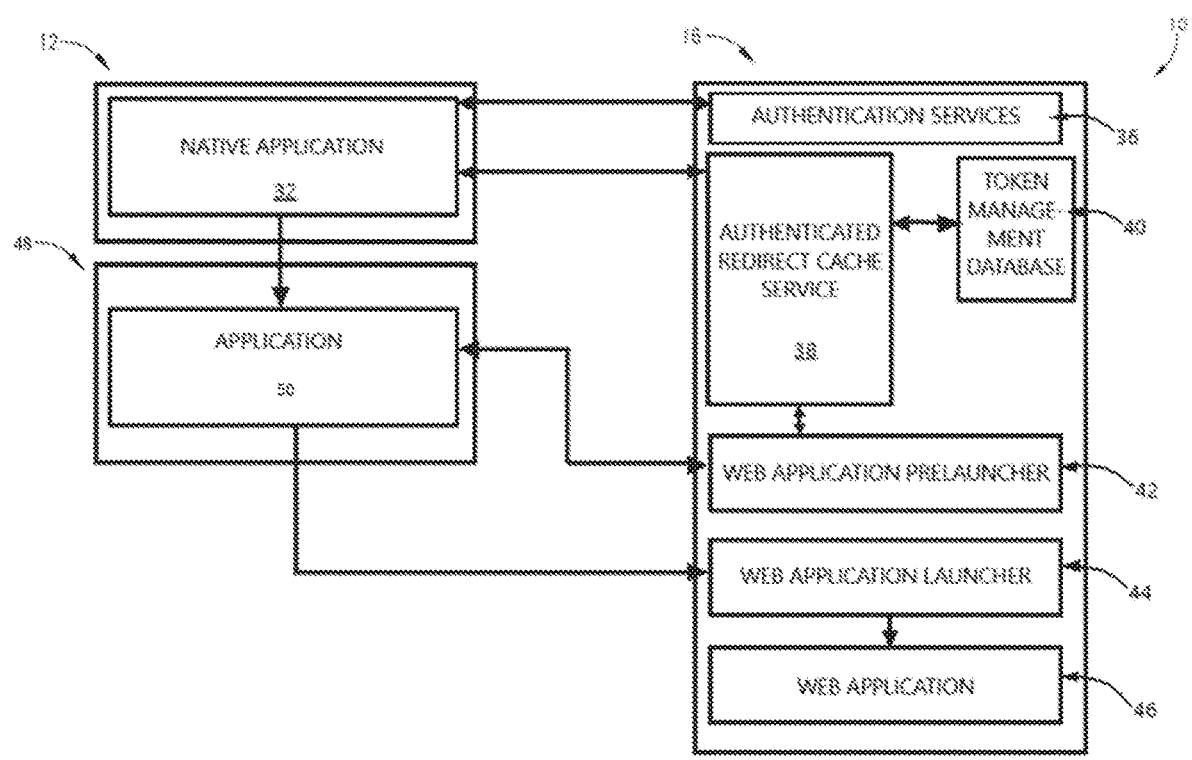
FIG. 6 illustrates a flowchart of various components of the exemplary system according to another embodiment of the present invention.

In an embodiment, the present invention may enable a user session to persist between one or more devices. As shown in FIG. 6, an application 50 of a second user device 48 may receive the client token and encrypted key from the mobile device 12 and the second user device 48 may transmit the client token and encrypted key to the server 16. The server 16 may obtain identifying data about the second device 48 and/or application 50 after having already obtained identifying data about the mobile device 12. The transmission from device to device may be by any known method of wired or wireless communication as discussed above. The server 16 may verify the client token, the encrypted key, and/or the identifying data. It should be noted that embodiments providing user session persistence between devices are similar in some respects to the other embodiments described herein, and may be employed in much the same way. Therefore, for the sake of brevity, only certain unique aspects of such additional embodiment(s) of the user session persistence systems and methods are described in this and the following several paragraphs, with a complete disclosure of the remaining aspects being readily understood by one of ordinary skill in the art upon a review of the disclosure elsewhere herein.

For example, a session may persist from the mobile device 12 to a telematics device, wherein the second device 48 is the telematics device. An authentication token may be generated by the server 16 and transmitted to the native application 32 of the mobile device 12 upon verification of login credentials. The native application 32 may generate a client token and receive a request to access the telematics device on the user's vehicle. The telematics device may be any device known in the art for collecting telematics data, such as location data, speed, weather, or the like. The telematics device may include a processing element, a memory element, a communication element, a location determining element (such as GPS), and/or various sensors.

The telematics device may be in communication with the server 16. The native application 32 may send the request to the server 16. The server may obtain first identifying data about the mobile device 12, generate an encrypted key, and send the encrypted key to the first native application 32. The native application 32 may transmit the encrypted key and the client token to the telematics device. The telematics device may request access to the server 16, passing the client token and the encrypted key to the server 16. The server 16 may obtain second identifying data regarding the telematics device and/or the user (e.g., device location data, user biometric data, etc.). The server 16 may verify the client token and/or the key, and it may ensure the first identifying data is consistent with the second identifying data. The server 16 may enable the telematics device to access the server 16. One of ordinary skill will appreciate that the first and second user devices may be mobile devices, smartphones, telematics devices, devices related to the internet of things (IoT), original equipment manufacturer (OEM) devices (such as computing devices installed in vehicles), and the like within the scope of the present invention.

The system may include additional, less, or alternate functionality and/or device(s), including those discussed elsewhere herein. For example, in an embodiment of the system, the client token may not be generated and verified. In other words, the authentication operations rely only on the verification of the encrypted key and/or the identifying data.

Exemplary Computer-Implemented Method

Figure 7:
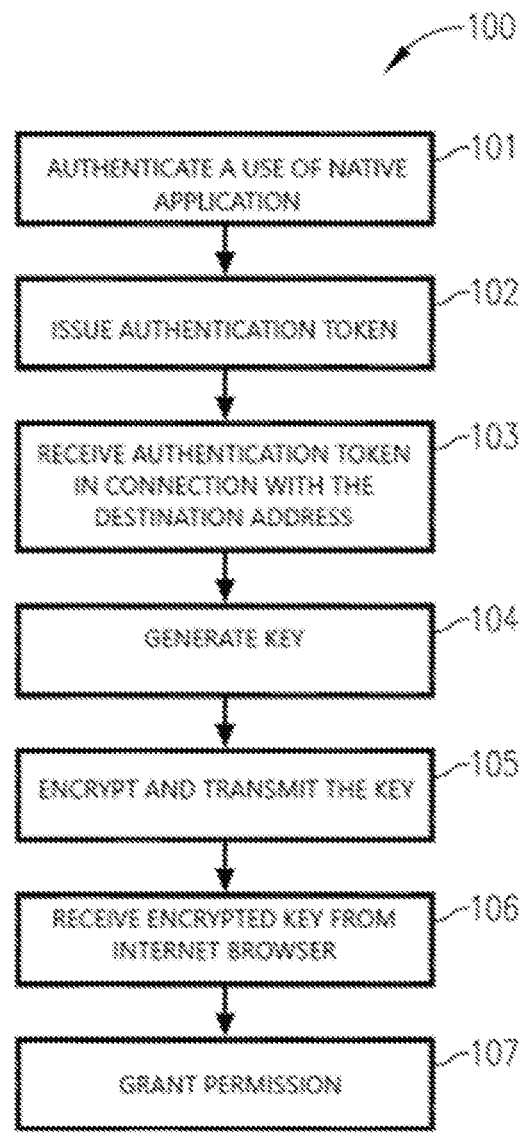
FIG. 7 illustrates at least a portion of the steps of an exemplary computer-implemented method for enabling user session persistence between a native application and a mobile internet browser.

FIG. 7 depicts a listing of steps of an exemplary computer-implemented method 100 for enabling user session persistence between a native application and a mobile internet browser on a mobile device. The steps may be performed in the order shown in FIG. 7, or they may be performed in a different order. Furthermore, some steps may be performed concurrently as opposed to sequentially. In addition, some steps may be optional.

The computer-implemented method 100 is described below, for ease of reference, as being executed by exemplary devices and components introduced with the embodiments illustrated in FIGS. 1-6. For example, the steps of the computer-implemented method 100 may be performed by the mobile device 12, the server 16, and the network 14 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 101, a use of a native application installed on a mobile device 12 may be authenticated. In an embodiment, the authentication may include receiving login credentials from a user interface 24 of the mobile device 12 and transmitting the login credentials. The login credentials may include a username/password, multi-factor authentication (such as two-factor authentication, two-step verification, or any other multi-factor authentication technique, or combinations thereof), biometric information (such as a fingerprint on a smart phone, facial recognition software, voice recognition software, or the like), or the like.

Referring to step 102, an authentication token may be generated and transmitted to the native application. The authentication token may be any security token known in the art, as discussed above. The authentication token may be generated using information regarding the user, the native application, the mobile device 12, etc.

A request for a feature may be received via the user interface and/or the native application may otherwise trigger operation of the feature. The feature may include or require a request to access a destination address requiring navigation to a web application. The destination address may be a uniform resource identifier (URI), a uniform resource name (URN), or a uniform resource locator (URL).

In an embodiment, a client token may be generated, which may be a session token, a shared secret software token type or a public-key cryptography software token type. The client token may also or alternatively include a static password token, a synchronous dynamic password token, an asynchronous password token, a challenge response token, or any other security token known in the art. The client token may be generated using information regarding the user relevant to persisting the user session. The information may include the user's internet protocol (IP) address, media access control (MAC) address, email address, username, password, or the like. The client token may be generated in a manner to securely pass the information regarding the user, such as through encryption and/or hashing of the information. The destination address, the authentication token, and the client token may be transmitted to the server 16.

Referring to step 103, the authentication token, the client token and the destination address may be received in connection with one another by the server 16 from the native application. First identifying data regarding the user, the native application, and/or mobile device 12 may also be obtained. The first identifying data may be obtained by, for example, retrieving various types of data about the native application and/or the mobile device 12, such as by accessing information from a server log that tracks requests from the native application and/or the mobile device 12. Alternatively and/or additionally, the first identifying data may be transmitted by the native application automatically and/or in response to a query from the server 16. The first identifying data may be any data related to the identity of the native application, the mobile device, the user, etc. The first identifying data may include an IP address of the mobile device 12, a MAC address of the mobile device 12, a burned-in address, an extended unique identifier, or the like. The first identifying data may also be biometric data, voice recognition, face recognition, GPS coordinates, router information, etc.

Referring to step 104, a key may be generated. For example, the destination address, the authentication token, the first identifying data, and/or the client token may be stored in a location on the token management database. The key may be generated based on the location in the token management database. The key may comprise a primary key and/or pointer to the location in the token management database where the destination address, the authentication token, the first identifying data and/or the client token are stored. In an embodiment, the key is stored in a data field of the same record with the destination address, the authentication token, the first identifying data, and the client token.

The key may also include and/or be associated with an expiration event. The key may be invalidated upon the occurrence of the expiration event, which may be evaluated at any time and/or in connection with or based on any other event. The expiration event may correspond to lapse of a time period following transmission to the native application (or another event described herein), a connection failure, a cancellation of the request, or the like. In an embodiment, the key may include a server token, or any other security token discussed above.

Data—e.g., the destination address, the authentication token, the first identifying data, and/or the client token—may be associated with one another in the token management database through known database relationships. For instance, relational databases may associate or link the data in one or more tables, each table containing fields organized into records. In such embodiments, each key may correspond to a single record, with the destination address, the authentication token, the first identifying data, and/or the client token being stored in additional fields of the record. One of ordinary skill will appreciate that other means for associating data in a database are within the scope of the present invention.

One or more data elements may also be exchanged between programs, routines or devices in connection with other data elements according to embodiments of the present invention. For example, the authentication token may be received in connection with the destination address. For another example, second identifying data may be obtained in connection with the encrypted key. It is foreseen that a variety of methods for signaling such relationship(s) between data elements may be employed without departing from the spirit of the present invention. One of ordinary skill will appreciate that the degree and type of relation between data elements that is required for receipt of those data elements to be considered "in connection" with one another may vary depending on the preferences of administrator(s). For example, for added certainty that an encrypted key and second identifying data were obtained from a common origin device, an administrator may require that they be received together in the same data packet. Additional certainty may be provided by consulting a checksum value to guard against tampered data packets. In an embodiment, sequence numbers in data packet headers may also or alternatively be utilized to confirm the relationship. However, other mechanisms of secure transmission protocols may also or alternatively ensure a common origin and/or grouping of messages within the scope of the present invention.

Referring to step 105, the key may be encrypted and transmitted to the native application. The encrypted key may be received by the native application and transmitted or otherwise passed, along with the client token, to the internet browser of the mobile device 12. Directions to request access to the server 16—e.g., to the web application pre-launcher—may also be passed to the internet browser.

Referring to step 106, the client token and the encrypted key may be received at the server 16 from the internet browser. Second identifying data may also be obtained and/or received from the internet browser. The second identifying data may be obtained in a similar or different manner than that in which the first identifying data was obtained.

The received encrypted key may be verified to ensure that it is consistent with the key passed to the native application, and that it is not expired. A verified, unexpired key may be used to access the corresponding location in the token management database storing the key, destination address, authentication token, first identifying data, and the client token (from the native application). The client token received from the internet browser may be verified to ensure that it is consistent with the client token received from the native application. The second identifying data may also be analyzed to ensure that it is consistent with the first identifying data. The second identifying data may be the same data type, or a different data type, as the first identifying data, so long as there is a consistency between the two that meets the security standards/needs in order to grant access. More particularly, the first identifying data and the second identifying data need not be the same, and need not be the same data type, but should be sufficiently related so that comparison of the first and the second identifying data yields a reasonably certain determination that the native application and the mobile internet browser are executing on the same mobile device 12 and/or are being used by the same (authenticated) user.

For example, mobile device 12 may be uniquely identified by a plurality of alphanumeric codes, and each of the first identifying data and the second identifying data may comprise one of the alphanumeric codes. Where the server 16 accesses a device profile of the mobile device 12 that contains the plurality of alphanumeric codes, the first identifying data and the second identifying data may be compared against the device profile to verify the mobile device 12 as the common origin. One of ordinary skill will appreciate that a variety of data may serve as identifying data for the user and/or mobile device within the scope of the present invention.

Referring to step 107, the internet browser may be granted permission to access the destination address by the server 16. The authentication token may be retrieved from the token management database and transmitted to the internet browser. The passing of the authentication token, which may include session information, automatically persists the session. In an embodiment, the authentication token may be modified, depending on the feature being requested. For example, information relevant to the feature that triggered navigation to the internet browser may be appended to the authentication token, or the authentication token may be injected in a session cookie. In an embodiment, a hypertext transfer protocol (HTTP) 302 redirect may be sent to the internet browser or the internet browser may otherwise be directed to the destination address stored with the primary key by the server 16. The internet browser may use the authentication token to access a portion of the server, such as a launcher of the web application, and transmit the authentication token in order to continue the session and thereby perform the feature.

In an embodiment, if it is determined that the internet browser 34 is not verified (e.g., based on comparison/verification of the client token, encrypted key and/or identifying data and/or expiration of the key), the session may be ended and/or suspended. The user may be notified via the native application 32 of the failure to verify and may be provided an opportunity for re-verification to enable performance of the feature. The notification may also or alternatively be in the form of a fraud alert, wherein the user is notified via the native application 32 that an attempt has been made to impersonate the user. The notification may also be merely a failure notice noting that navigation between the native application 32 and the internet browser 34 failed. Any sensitive data involved in an attempted or completed user session persistence operation (e.g., from the token management database 40), such as the key, the authentication token, the destination address, the identifying data, etc., may be deleted following a failure to verify and/or following a successfully completed authenticated user session handoff to the internet browser.

The method steps outlined herein may also be implemented between any number of applications to provide user session persistence from one application to another. In other words, the encrypted key and/or client token may be passed among different applications on the same mobile device. For example, the native application 32 may pass the encrypted key and client token to another native application, which is verified, substantially in the manner described herein for use in connection with the internet browser 34. This enables secure extension of features from different native applications to persist a user session.

In another embodiment, the present invention may enable a user session to persist between one or more devices. A method of authenticated user session handoff between devices may include the following steps performed by at least one server: (1) authenticating a use of a first application on a first device; (2) issuing an authentication token to the first application; (3) receiving from the first application the authentication token in connection with a destination address and a client token; (4) obtaining first identifying data regarding the first device; (5) generating a key; (6) associating the key, the client token, the authentication token, the destination address, and the first identifying data regarding the first device together in a database; (7) encrypting the key to generate an encrypted key; (8) transmitting the encrypted key to the first application of the first device; (9) receiving a second copy of the client token and the encrypted key from a second application running on a second device, wherein the second application received the client token and the encrypted key from the first application; (10) obtaining second identifying data regarding the second device in connection with the encrypted key and the client token received from the second device; (11) decrypting the encrypted key from the second device to generate a decrypted key; (12) confirming that the decrypted key and/or the encrypted key from the second application is not expired and that it matches the encrypted key transmitted to the first application; (13) retrieving the authentication token, the client token (from the first application), the destination address, and the first identifying data from the database using the decrypted key; (14) confirming that the first identifying data and the second identifying data are consistent with an authorized authenticated user session handoff between the first device and the second device; (15) verifying that the client token from the second application matches the client token from the first application; and (16) granting the second application authenticated access to the destination address. The first application and the second application may each be a native application, a hybrid application, an internet browser, or the like without departing from the spirit of the present invention.

It should be noted that step (14) in the preceding paragraph may be carried out in any number of ways without departing from the spirit of the present invention. For instance, the at least one server may access and/or maintain a plurality of device profiles, with each device profile including a list of computing devices owned by the same user along with unique alphanumeric strings identifying each of the listed computing devices. The device profiles may be maintained by individual users via authenticated login to the at least one server (e.g., following each purchase of a computing device) and/or automatically via queries to warranty registration application programming interface(s) maintained by third party device vendors or the like. The first identifying data and the second identifying data may include unique alphanumeric strings respectively identifying the first device and the second device. Step (14) may then include comparing the first identifying data and the second identifying data to the device profiles to determine whether a single device profile includes both. If so, the first identifying data and the second identifying data may be considered consistent with an authorized authenticated user session handoff between the first device and the second device.

In addition, at least because several users may have access to one or both of the first device and the second device (e.g., family members), the at least one server may issue some form of reauthentication query to the second device following and/or in conjunction with completion of step (14). In an embodiment, the reauthentication query may be less onerous than a full reauthentication (e.g., reentry of the credentials required for initial authentication of the use of the first application), such as where the at least one server transmits a notification to the first device requesting the user to press "Yes" in response to information regarding the attempted session handoff to the second device. In another embodiment, the reauthentication query may be passive, for instance requesting location data be provided by location determining elements of the first device and the second device. The at least one server may compare the location data to ensure the first device and the second device are relatively proximate to each other at the time when handoff is requested by the second device (e.g., within twenty feet). It is foreseen that a variety of additional measures may be performed with embodiments of the present invention.

In an embodiment, a session may persist from a native application of a mobile device to an application of a telematics device. The telematics device may be any device known in the art for collecting telematics data, such as location data, speed data, weather data, or the like. The telematics device may include a processing element, a memory element, a communication element, a location determining element (such as GPS), and/or various sensors.

The method may include additional, less, or alternate steps and/or device(s), including those discussed elsewhere herein.

Exemplary System Comprising Computer-Readable Media for Enabling User Session Persistence In another aspect, a system comprising computer-readable media for enabling user session persistence between a native application and a mobile internet browser on a mobile device may be provided. The system may include a computer-readable medium including an executable program stored thereon and/or externally, wherein the program instructs a processing element of a server to perform the following steps: (1) authenticate a use of the native application; (2) issue an authentication token to the native application; (3) receive from the native application the authentication token in connection with a destination address; (4) obtain first identifying data regarding the mobile device; (5) generate a key; (6) associate the key, the authentication token, the destination address, and the first identifying data regarding the mobile device together in a database; (7) encrypt the key to generate an encrypted key; (8) transmit the encrypted key to the native application; (9) receive from the mobile internet browser the encrypted key; (10) obtain second identifying data in connection with the encrypted key; (11) decrypt the encrypted key to generate a decrypted key; (12) locate the authentication token, the destination address, and the first identifying data within the database using the decrypted key; and (13) confirm that the mobile internet browser is executing on the mobile device based at least in part on a comparison of the first identifying data and the second identifying data.

The system may also include a second non-transitory computer-readable medium with the native application stored thereon and/or externally, wherein the native application instructs a hardware processing element of a mobile device to perform the following: (1) receive an authentication token from the server; (2) receive a request to access a destination address via the user interface; (3) transmit the authentication token and the destination address to the server; (4) receive an encrypted key from the server; and (5) transmit the encrypted key to the internet browser installed on the mobile device with instructions to request access to the server for authenticated user session handoff.

The system is described herein, for ease of reference, as being executed by exemplary devices and components introduced with the embodiments illustrated in FIGS. 1-6. For example, the operations instructed by the programs on the computer-readable media may be performed by the mobile device 12, the server 16, and the network 14 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. The program(s) stored on the computer-readable medium(s) may instruct the processing element(s) to perform additional, fewer, or alternative actions, including those discussed elsewhere herein.

In an embodiment, the authentication of the use of the native application may be accomplished using login credentials. The native application may instruct a processing element of the mobile device 12 to receive login credentials from a user interface of the mobile device 12 and transmit the login credentials to the server 16. The login credentials may include a username/password, multi-factor authentication (such as two-factor authentication, two-step verification, or any other multi-factor authentication technique, or combinations thereof), biometric information (such as a fingerprint on a smart phone, facial recognition software, voice recognition software, or the like), or the like. The program of the server 16 may instruct the processing element to receive the login credentials from the native application and verify the login credentials. Following verification, the program of the server 16 may instruct the processing element to generate the authentication token and/or transmit the authentication token to the mobile device. The authentication token may be a session token, a shared secret software token type, or a public-key cryptography software token type. The authentication token may also be a static password token, a synchronous dynamic password token, an asynchronous password token, a challenge response token, or any other security token known in the art. The authentication token may be generated using information regarding the user, the program installed on the mobile device 12, the mobile device 12, etc. In an embodiment, an authentication service of the program of the server 16 may authenticate the use of the native application.

In an embodiment, the destination address received by the native application may designate or otherwise be associated with a web application of the server 16. The destination address may be in the form of an input on the user interface that represents a call to a uniform resource identifier (URI), a uniform resource name (URN), or a uniform resource locator (URL).

The native application may instruct the processing element of the mobile device 12 to generate a client token before or after the receipt of the destination address. In an embodiment, the native application may instruct the processing element to generate the client token using information regarding the user relevant to persisting the user session. The information may include the mobile device's 12 internet protocol (IP) address or media access control (MAC) address, or it may include the user's email address, username, password, or the like. The client token may be generated through encryption and/or hashing of the information.

In an embodiment of the present invention, the first identifying data may be obtained by retrieving various types of data about the native application and/or the mobile device 12, such as by accessing information from a server log tracking requests from the native application and/or the mobile device 12. Alternatively and/or additionally, the native application may instruct the processing element and/or the communication element to transmit the first identifying data along with the client token. The first identifying data may be any data related to the identity of the native application, the mobile device 12, the user, etc. It may include an IP address of the mobile device 12, the MAC address of the mobile device 12, a burned-in address, an extended unique identifier, or the like. The first identifying data may also be biometric data, voice recognition, face recognition, GPS coordinates, router information, etc.

In an embodiment, the key may be a server token generated based in part on an association with the destination address, the authentication token, the first identifying data, and/or the client token. For example, the destination address, the authentication token, the first identifying data, and/or the client token may be stored in a location on the token management database. The server token may be generated based on that location in the token management database, for instance where the key comprises a primary key and/or pointer to the location in the token management database 40 where the destination address, the authentication token, the first identifying data and/or the client token are stored.

The key may also include and/or be associated with an expiration event. The program of the server 16 may instruct the processing element to invalidate the key upon the occurrence of the expiration event, which may be evaluated at any time and/or in connection with or based on any other event outlined herein. The expiration event may correspond to elapse of a time period following transmission to the native application (or another event described herein), a connection failure, a cancellation of the request, or the like. The program of the server 16 may instruct the processing element to encrypt the key and transmit the encrypted key to the native application. In an embodiment, the authenticated redirect cache service of the program of the server 16 may generate the key.

Data—e.g., the destination address, the authentication token, the first identifying data, and/or the client token—may be associated with one another in the token management database through known database relationships. For instance, relational databases may associate or link the data in one or more tables, each table containing fields organized into records. In such embodiments, each key may correspond to a single record, with the destination address, the authentication token, the first identifying data, and/or the client token being stored in additional fields of the record. One of ordinary skill will appreciate that other means for associating data in a database are within the scope of the present invention.

One or more data elements may also be exchanged between devices in connection with other data elements according to embodiments of the present invention. For example, the authentication token may be received in connection with the destination address. For another example, second identifying data may be obtained in connection with the encrypted key. It is foreseen that a variety of methods for signaling such relationship(s) between data elements may be employed without departing from the spirit of the present invention. One of ordinary skill will appreciate that the degree and type of relation between data elements that is required for receipt of those data elements to be considered "in connection" with one another may vary depending on the preferences of administrator(s). For example, for added certainty that an encrypted key and second identifying data were obtained from a common origin device, an administrator may require that they be received together in the same data packet. Additional certainty may be provided by consulting a checksum value to guard against tampered data packets. In an embodiment, sequence numbers in data packet headers may also or alternatively be utilized to confirm the relationship. However, other mechanisms of secure transmission protocols may also or alternatively ensure a common origin and/or grouping of messages within the scope of the present invention.

In an embodiment, the native application may instruct the processing element to transmit or otherwise pass the client token and the encrypted key to the internet browser of the mobile device 12. The native application may also instruct the processing element to pass directions to request access to the server 16 with the encrypted key and the client token. For example, the directions may comprise instructions for requesting access to a URL of the web application of the server 16 and/or to the web application pre-launcher. In an embodiment, the destination address is not passed from the native application to the internet browser (only the address for performing reauthentication steps), at least in part to avoid passing the destination address over an insecure connection.

The internet browser of the mobile device may call the address of the server (i.e., the web application pre-launcher address) passing the client token and the encrypted key. In some embodiments, the internet browser may also pass second identifying data. The second identifying data may be obtained in a similar or different manner than how the first identifying data was obtained. The second identifying data may be the same or different data type as the first identifying data, so long as there is a consistency between the two that meets the security standards/needs in order to grant access. For example, the first identifying data may be transmitted by the native application and include an IP address, and the second identifying data may be obtained by the server by reviewing server logs associated with the internet browser. More particularly, the first identifying data and the second identifying data need not be the same, and need not be the same data type, but should be sufficiently related so that comparison of the first and the second identifying data yields a reasonably certain determination that the native application and the mobile internet browser are executing on the same mobile device 12 and/or are being used by the same (authenticated) user.

In some embodiments, to confirm that the internet browser is installed on the mobile device 12, the program installed on the server 16 may instruct the processor to verify that the encrypted key is consistent with the encrypted key passed to the native application; that the client token is consistent with the client token received from the native application; and/or the second identifying data is consistent with the first identifying data. For example, the web application pre-launcher of the server 16 may instruct the processing element of the server 16 to pass the encrypted key, the client token, and the second identifying data to the authenticated redirect cache service. The authenticated redirect cache service may instruct the processing element to decrypt the encrypted key to find the location in the token management database storing the client token (from the native application), the authentication token, and first identifying data. The authenticated redirect cache service may instruct the processing element to verify that the client token retrieved from the token management database is consistent with the client token received from the internet browser. Further, the authenticated redirect cache service may instruct the processing element to verify that the first identifying data retrieved from the token management database is consistent with the second identifying data.

Embodiments of the present invention provide safeguards against interception of private information and/or data, and/or against misappropriation of an authenticated session. For example, because the connection between the native application and the mobile internet browser is insecure, a hacker may steal the encrypted key and present itself as the user to the server. The program on the server may instruct the processing element to require, receive, or obtain identifying data from the hacker device. The program on the server may instruct the processing element to analyze the identifying data and determine that the identifying data from the hacker device is inconsistent with the identifying data from the user device and therefore end the session with the hacker.

If, on the other hand, the program on the server 16 determines that the internet browser is verified, it may instruct the processing element to grant the internet browser of the mobile device 12 permission to access the feature (i.e., the web application), including by transmitting the authentication token to the internet browser. For another example, the authenticated redirect cache service may instruct the processing element to pass the authentication token to the web application, which grants the internet browser access to the destination address. The access grant may be in the form of passing a URL of the web application launcher—which provides access to the web application—to the internet browser. The passing of the authentication token, which may include session information, may automatically persist the session.

In some embodiments, the program on the server, such as the web application and/or the authenticated redirect cache service, may instruct the processing element to modify the authentication token, depending on a feature being requested. For example, some sensitive information stored in the authentication token may be omitted for additional security purposes and because it is not needed by the feature to perform its function. Also, information relevant to the feature may be appended to the authentication token. In some embodiments, the program on the server and/or web application may instruct the processing element of the server to enable the internet browser to access the feature by sending a hypertext transfer protocol (HTTP) 302 redirect to the internet browser.

The programs herein may also be implemented between any number of applications to provide user session persistence from one application to another. In other words, the client token and encrypted key may be passed among different applications executing on the same mobile device. For example, the native application may instruct the processing element to pass the key and client token to another native application, which is verified by, and communicates with, the server. This enables secure extension of features from different native applications to persist a user session.

In another embodiment, the present invention may enable a user session to persist among two or more devices. A third computer-readable medium having an executable program stored thereon may instruct a processing element of a second user device. The program stored on the third computer-readable medium may instruct the processing element of the second device to perform in substantially the manner outlined in the preceding section with respect to device-to-device authenticated user session handoff. The first and second user devices may be mobile devices, smartphones, telematics devices, devices related to the internet of things (IoT), original equipment manufacturer (OEM) devices (such as computing devices installed in vehicles), and the like.

In an embodiment of the system, the client token may not be generated and verified. In other words, the authentication operations may rely only on the verification of the encrypted key and/or the identifying data without a client token.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:

1. A computer-implemented method for enabling user session persistence between a native application and a mobile internet browser on a mobile device, the method comprising:
   authenticating a use of the native application;
   issuing an authentication token to the native application;
   receiving from the native application the authentication token in connection with a destination address;
   obtaining first identifying data regarding the mobile device;
   generating a key;
   associating the key, the authentication token, the destination address, and the first identifying data regarding the mobile device together in a database;
   encrypting the key to generate an encrypted key;
   transmitting the encrypted key to the native application;
   receiving from a mobile internet browser the encrypted key;
   obtaining second identifying data in connection with the encrypted key;
   decrypting the encrypted key to generate a decrypted key;
   locating the authentication token, the destination address, and the first identifying data within the database using the decrypted key; and
   confirming that the mobile internet browser is executing on the mobile device based at least in part on a comparison of the first identifying data and the second identifying data.

2. The method of claim 1, further including—
   transmitting the destination address and the authentication token to the mobile internet browser;
   receiving, at a server corresponding to the destination address, the authentication token from the mobile internet browser;
   authenticating a use of the server by the mobile internet browser based on the authentication token.

3. The method of claim 2, wherein the step of transmitting the destination address and the authentication token to the mobile internet browser includes injecting the authentication token into a session cookie.

4. The method of claim 1, further including—
   receiving from the native application a client token;
   associating the client token with the key, the authentication token, the destination address, and the first identifying data in the database;
   receiving the client token from the mobile internet browser,
      wherein confirming that the mobile internet browser is executing on the mobile device includes matching the client token against the client token of the database.

5. The method of claim 1, wherein the destination address points to a computing device executing a mobile web application.

6. The method of claim 1, wherein the database is a token management database.

7. The method of claim 1, further including deleting at least one of the key, the authentication token, the destination address, and the first identifying data from the database after comparison of the first identifying data against the second identifying data.

8. The method of claim 1, wherein the first identifying data and the second identifying data each includes an IP address.

9. The method of claim 1, wherein the first identifying data and the second identifying data each includes GPS coordinates.

10. The method of claim 1, wherein the first identifying data and the second identifying data each includes biometric data of a user.

11. The method of claim 1, wherein authentication of the use of the native application includes receiving login credentials.

12. The method of claim 11, wherein the login credentials include a username and password.

13. The method of claim 1, wherein the encrypted key is passed between the native application and the mobile internet browser in the mobile device via an insecure connection.

14. The method of claim 13, wherein the encrypted key is subject to expiration after a set time.

15. The method of claim 1, wherein the destination address comprises a HTTP 302 redirect.

16. The method of claim 1, wherein the destination address points to a web server configured to provide access to sensitive user data.

17. The method of claim 1, further including transmitting a notification to the native application if the first identifying data does not match the second identifying data.

18. The method of claim 17, wherein the communications take place during a user session, further including deleting all data received during the user session from the mobile device via the native application based, at least in part, on the notification.

19. The system of claim 18, wherein each of the first identifying data and the second identifying data is an IP address.

20. A system for enabling user session persistence between a native application and an internet browser, the system comprising:
- a mobile device having the native application and the internet browser installed thereon;
- a server in communication with the mobile device, the server including—
  - a token management database;
  - an authentication service configured to—
    - receive login credentials from the native application;
    - verify the login credentials;
    - generate a session token;
    - transmit the session token to the native application;
  - an authenticated redirect cache service configured to—
    - receive from the native application the session token, a first client token, and a desired URI;
    - obtain first identifying data from the native application regarding the mobile device;
    - generate a server token;
    - encrypt the server token to generate an encrypted server token;
    - store the server token, the first client token, the desired URI, and the first identifying data in association in the token management database;
    - transmit the encrypted server token to the native application; and
- a web application pre-launcher configured to—
  - receive from the internet browser a second client token and the encrypted server token;
  - obtain second identifying data from the internet browser regarding the mobile device and in connection with the encrypted server token;
  - provide the second client token, the encrypted server token, and the second identifying data to the authenticated redirect cache service as a redirect request;
  - wherein the authenticated redirect cache service is further configured to—
    - decrypt the encrypted server token to determine a pointer to a location in the token management database;
    - retrieve the first client token and the first identifying data from the location in the token management database;
    - confirm that the redirect request originated with the mobile device at least in part by verifying respectively that the first client token matches the second client token, and that the first identifying data is consistent with the second identifying data;
    - transmit the session token and the desired URI to the internet browser via the web application pre-launcher.

\* \* \* \* \*